US006786289B2

(12) United States Patent
Bateman et al.

(10) Patent No.: US 6,786,289 B2
(45) Date of Patent: Sep. 7, 2004

(54) SKID STEER VEHICLE WITH DIRECT DRIVE

(75) Inventors: Troy D. Bateman, Joliet, IL (US); Anthony J. Lamela, Gilberts, IL (US)

(73) Assignee: Case Corporation, Racine, WI (US)

( * ) Notice: Subject to any disclaimer, the term of this patent is extended or adjusted under 35 U.S.C. 154(b) by 66 days.

(21) Appl. No.: 10/143,601

(22) Filed: May 10, 2002

(65) Prior Publication Data

US 2003/0209379 A1 Nov. 13, 2003

(51) Int. Cl.[7] .............................................. B60K 17/00
(52) U.S. Cl. ..................... 180/6.48; 180/305; 180/308
(58) Field of Search ................... 180/6.48, 291, 180/292, 312, 58, 6.44, 6.66, 24.09, 24.11, 24.12, 242, 246, 301, 302, 337, 371, 343, 346, 307, 306, 305

(56) References Cited

U.S. PATENT DOCUMENTS

| | | | | |
|---|---|---|---|---|
| 2,257,772 A | * | 10/1941 | Wolf | 180/69.6 |
| 2,311,922 A | * | 2/1943 | Allin | 180/246 |
| 3,115,936 A | | 12/1963 | Blews, Jr. | 416/120 |
| 3,635,365 A | * | 1/1972 | Bauer | 414/715 |
| 3,810,517 A | | 5/1974 | Hurlburt et al. | 180/246 |
| 3,905,251 A | | 9/1975 | Greene | 475/72 |
| 3,907,053 A | | 9/1975 | Savage | 180/6.48 |
| 4,168,757 A | * | 9/1979 | Mather et al. | 180/6.48 |
| 4,407,381 A | | 10/1983 | Oswald et al. | 180/6.48 |
| 4,597,468 A | * | 7/1986 | Friedrich | 180/255 |
| 4,763,751 A | | 8/1988 | Gardner, Jr. | 180/305 |
| 4,955,455 A | * | 9/1990 | Albright et al. | 180/291 |
| 4,962,821 A | * | 10/1990 | Kim | 180/6.48 |
| 4,962,825 A | * | 10/1990 | Albright et al. | 180/292 |
| 5,768,955 A | | 6/1998 | Hauser | 74/606 R |
| 5,964,567 A | * | 10/1999 | Bamford | 414/685 |
| 6,182,780 B1 | * | 2/2001 | Brookins | 180/242 |
| 6,182,784 B1 | * | 2/2001 | Pestotnik | 180/376 |
| 6,216,812 B1 | * | 4/2001 | Pertusi | 180/339 |
| 6,425,453 B1 | | 7/2002 | Knutson et al. | 180/256 |
| 6,513,614 B2 | * | 2/2003 | Knutson et al. | 180/242 |
| 6,634,445 B2 | * | 10/2003 | Dix et al. | 180/6.48 |
| 6,650,985 B2 | * | 11/2003 | Lin et al. | 701/50 |
| 2002/0036110 A1 | * | 3/2002 | Panizzolo | 180/343 |
| 2003/0116936 A1 | * | 6/2003 | Felsing et al. | 280/124.166 |
| 2003/0173132 A1 | * | 9/2003 | Komatsu et al. | 180/291 |
| 2003/0188910 A1 | * | 10/2003 | Bateman et al. | 180/305 |
| 2003/0205426 A1 | * | 11/2003 | Lamela et al. | 180/305 |

FOREIGN PATENT DOCUMENTS

GB          2 262 264          6/1993          ........... B62D/11/04

OTHER PUBLICATIONS

Bobcat Takes The Skid Steer A Start Further, www.equipmentworld.com/article/2001/04/04/1536_bauma.php3   2 pgs., Jun. 1, 2001—1:10 pm.
IR World, Nov.–Dec. 2001, pp. 15–22.

* cited by examiner

Primary Examiner—Christopher P. Ellis
Assistant Examiner—J. Allen Shriver
(74) Attorney, Agent, or Firm—Collin A. Webb; John William Stader (57) ABSTRACT

A skid steer vehicle has a drive system that includes hydraulic motor coupled to a reduction gearbox. A driveshaft extends fore-and-aft from the gearbox and is coupled at each end to a combined housing including a reduction gear set and an axle. The axle extends laterally outward from the vehicle and a wheel is fixed to its outer end. There are two housings on either end of the driveshaft. There are two such drive systems on the vehicle, one on either side. Thus the vehicle has two separate drive systems, each capable of independently driving two wheels on opposing sides of the vehicle.

14 Claims, 7 Drawing Sheets

SKID STEER VEHICLE WITH DIRECT DRIVE

FIELD OF THE INVENTION

The invention relates generally to drive systems for skid steer vehicles. More particularly, it relates to skid steer vehicles having a direct gear drive.

BACKGROUND OF THE INVENTION

Skid steer vehicles such as skid steer loaders were invented perhaps thirty years ago to provide a small vehicle on a highly maneuverable platform for working in close quarters on construction sites. They were called "skid steer loaders" since they had fixed axles, two per side, and could drive the wheels on one side of a vehicle at one speed and the wheels on the other side of the vehicle at a second speed. To turn the vehicles, the wheels on each side of the vehicle are driven at different speed, and even in opposite directions. It is this latter mode of operation that permits the vehicles to rotate about a vertical axis.

The drive mechanisms for these vehicles rely upon the fact that, on each side of the vehicle, the wheels were driven at the same speed. Each wheel is supported by an axle and the axles on the same side of the vehicle are driven by a single motor. The axles on the other side of the vehicle are also driven by a second motor.

As these vehicles have developed, the axles were quite long and extended from the outside of the vehicle through a sidewall of the vehicle and into the interior of the vehicle, where they are joined via chains to a common hydraulic motor. Since chains are subject to wear, however, they need frequent replacement at some expense. Since they are located within the sidewalls of the vehicle, the chain tank takes up space that could be better used as space for the operator. The use of chains requires a longitudinally extending chain tank or chain bucket in which oil baths the chain. Since this tank extends from forward axle to rearward axle, it extends substantially the entire length of the vehicle.

By extending all the axles into the center of the vehicle and driving them from a common central chain tank, the drive mechanism consume considerable interior space. Furthermore, by using chains to connect the motors to the axles, the vehicles require regular chain replacement, which increases down time. What is needed, therefore is a skid steer vehicle with a drive system that does not require a chain tank nor periodic replacement of a drive chain. What is also needed is a skid steer vehicle in which the drive components have been moved to the sides of the vehicle, thereby permitting a larger internal open space. It is an object of this invention to provide such a system in one or more claimed embodiments.

SUMMARY OF THE INVENTION

In accordance with a first embodiment of the invention, a skid steer vehicle is provided that has a direct drive system eliminating the extended drive chain of the traditional skid steer vehicle and replacing it with a gear and shaft drive that couples a hydraulic motor to a forward and aft drive wheel. This arrangement is provided on both sides of the vehicle. It disposes the drive elements adjacent to the sidewalls of the vehicle thereby reducing the intrusion of drive components near the center of the vehicle.

This system includes a hydraulic motor adjacent to a sidewall of the vehicle that is mounted to a gearbox including a reduction gear set comprised of a planetary gear set and a gear reducing spur gear drive set. This gearbox drives a driveshaft that passes through the gearbox, extending forward and aft along the sidewall of the vehicle.

The forward end of the driveshaft engages a bevel pinion gear in a combined gear housing and axle support structure. The bevel pinion gear, in turn, engages a bevel bull gear that is fixed to one of the vehicle's axles. This axle extends laterally outward and away from the vehicle, and is supported inside the combined housing. It extends out of the housing and has a wheel bolted to its outer end.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PREFERRED EMBODIMENT

Figure 1:
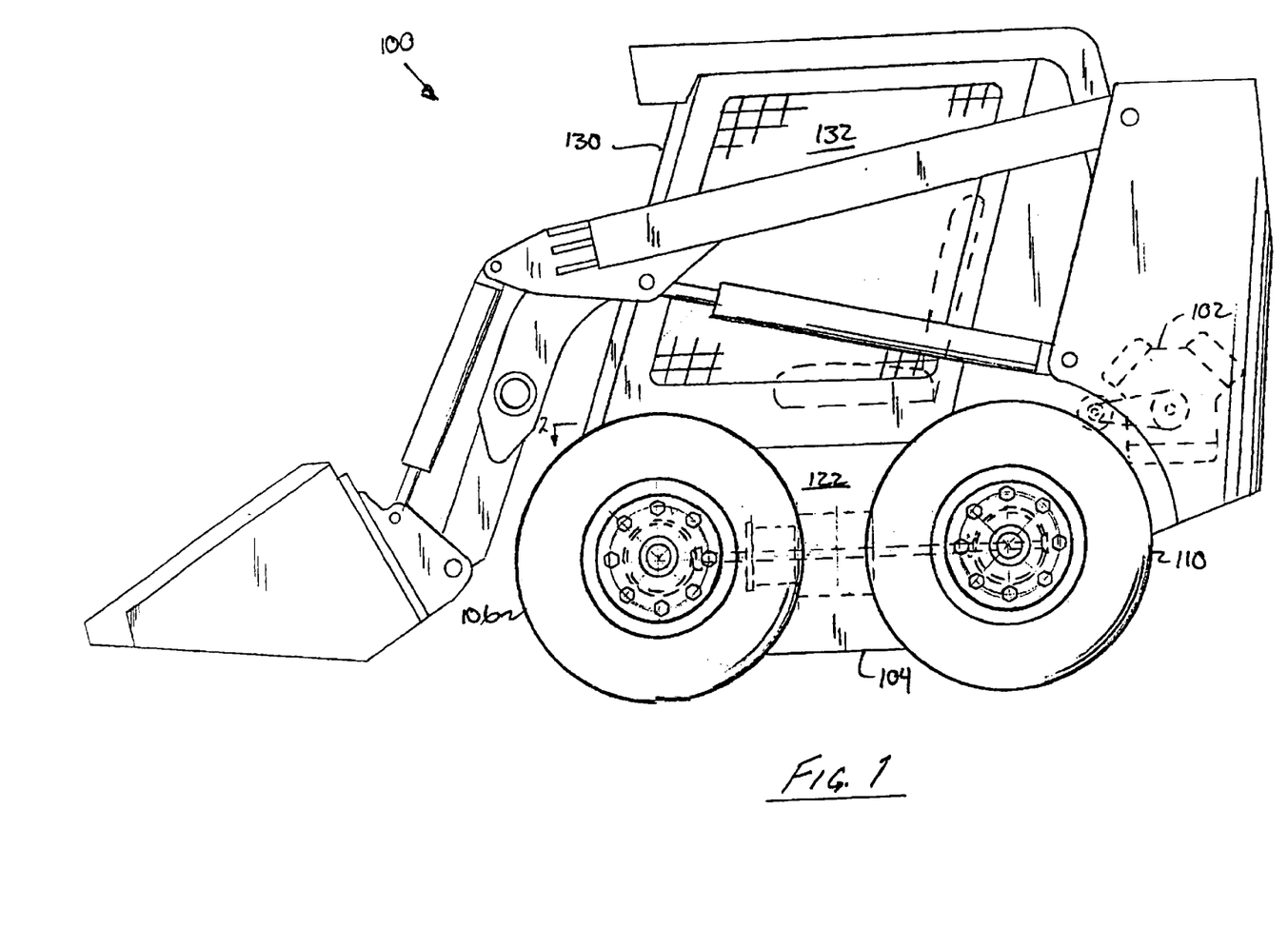
FIG. 1 is a side view of a skid steer vehicle (here shown as a skid steer loader) in accordance with the present invention.
Figure 2:
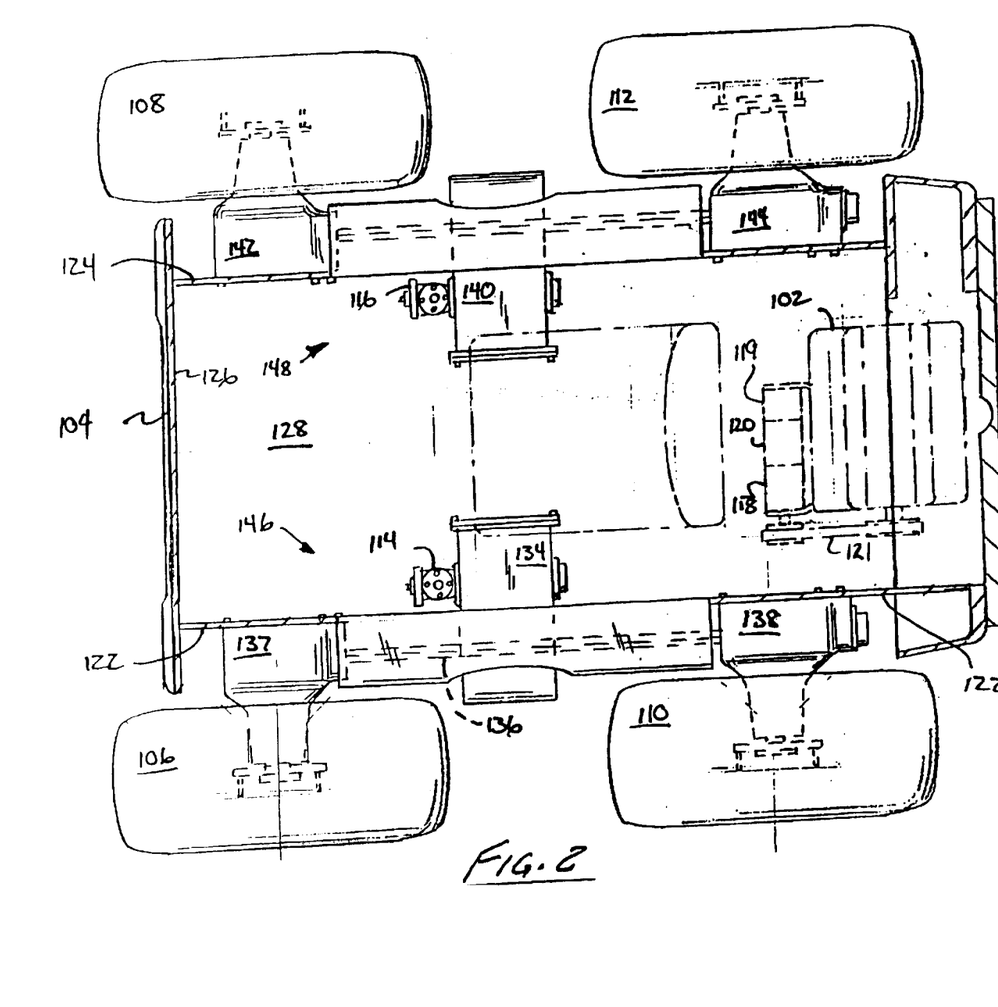
FIG. 2 is a top view of the vehicle of the preceding FIGURE taken at section line 2—2 in FIG. 1 showing the drive system.

Referring to FIGS. 1 and 2 shows a skid steer vehicle 100 having an engine 102 that is mounted on a chassis 104. The chassis 104 is supported on two front wheels 106, 108 and two rear wheels 110 and 112. Hydraulic motors 114 and 116 respectively drive two pairs of wheels 106, 110 and 108, 112, respectively. Hydraulic fluid for hydraulic motors 114 and 116 is provided by hydraulic pumps 118, 120, to which motors 114 and 116 are respectively fluidly coupled. Pumps 118 and 120 are coupled to and driven by engine 102. A charge pump 119 is also coupled to and driven by engine 102 to provide hydraulic fluid to the circuits coupling the motors and the other pumps. The hydraulic circuit can be seen in greater detail in FIG. 8.

Engine 102 is preferably an internal combustion engine such as a 2 to 6 cylinder gasoline or diesel engine. Hydraulic pumps 118 and 120 are driven by the crankshaft of engine 102, to which they are rotationally coupled by belt 121.

Chassis 104 includes two sidewalls 122 and 124 disposed on the left and the right side of the vehicle, respectively, as well as forward wall 126 and floor pan 128. The walls and the floor pan, together with engine 102 and rollover cage 130 (which is coupled to the chassis) define the general outlines of the operator's compartment 132.

Each side of the vehicle is equipped with a drive system that drives the vehicle over the ground. The drive system 146 for the left side of the vehicle includes hydraulic motor 114, gearbox 134, driveshaft 136, front and rear axle housings 137 and 138, and drive wheels 106 and 110. The drive system 148 for the right side of the vehicle includes hydraulic motor 116, gearbox 140, front and rear axle housings 142, and 144, and drive wheels 108 and 112. Drive systems 146 and 148 are mirror images of each other mirrored about a longitudinal centerline of the vehicle.

Regarding drive system 146, and as best shown in FIGS. 3–6, hydraulic motor 114 is coupled to gearbox 134, which is a speed-reducing gearbox. Shaft 150 of hydraulic motor 114 extends fore-and-aft and rotates whenever hydraulic fluid from hydraulic pump 118 is directed through it. Shaft 150 is coupled to and drives gearset 152, which is disposed inside the casing 154 of gearbox 134. Gearset 152 is coupled to and drives speed-reducing spur gearset 156, which is also disposed inside casing 154 of gearbox 134.

Figure 3:
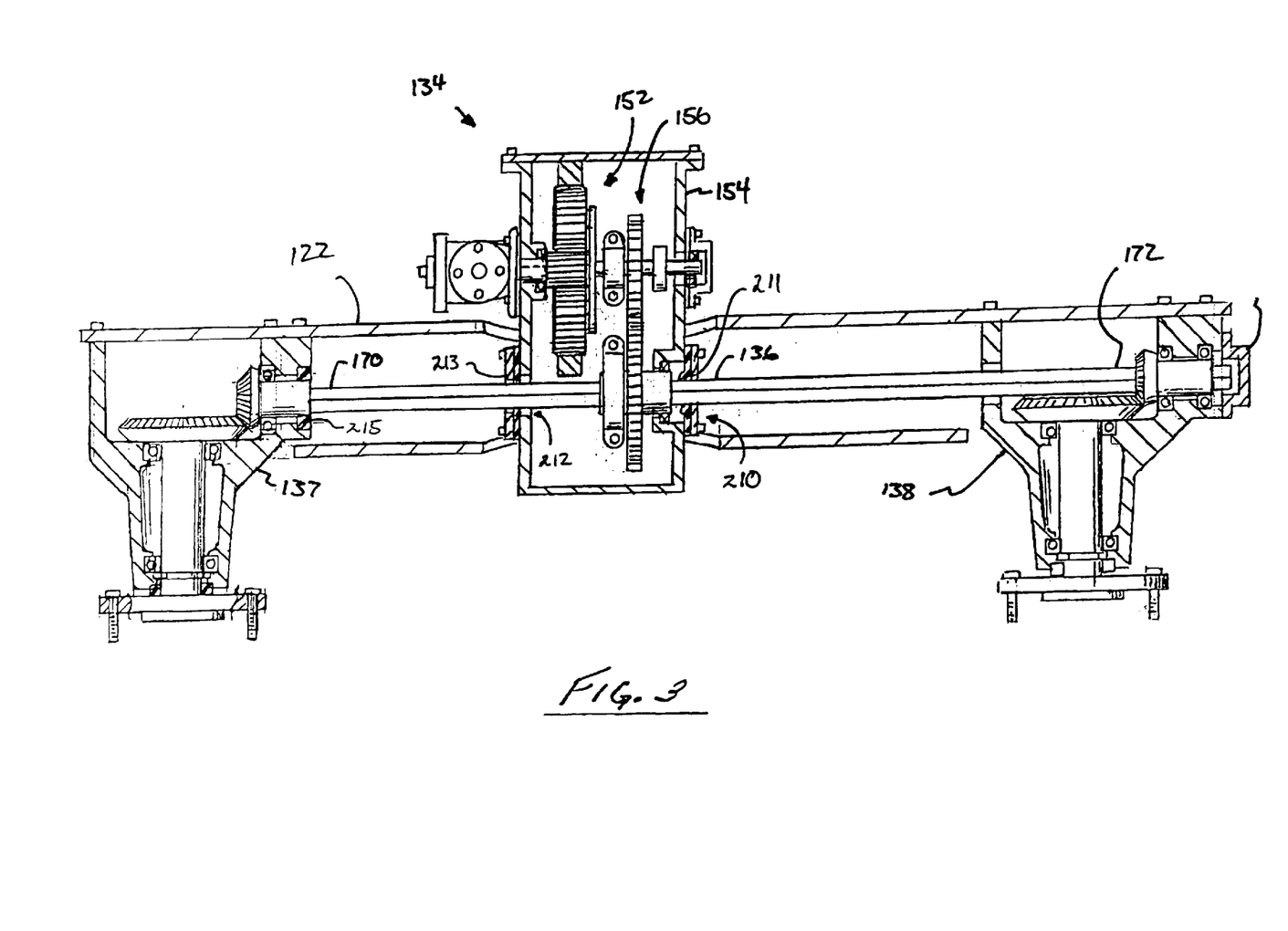
FIG. 3 is a partial cutaway view of the vehicle showing the left hand drive system in more detail, including its internal components and gears.
Figure 4:
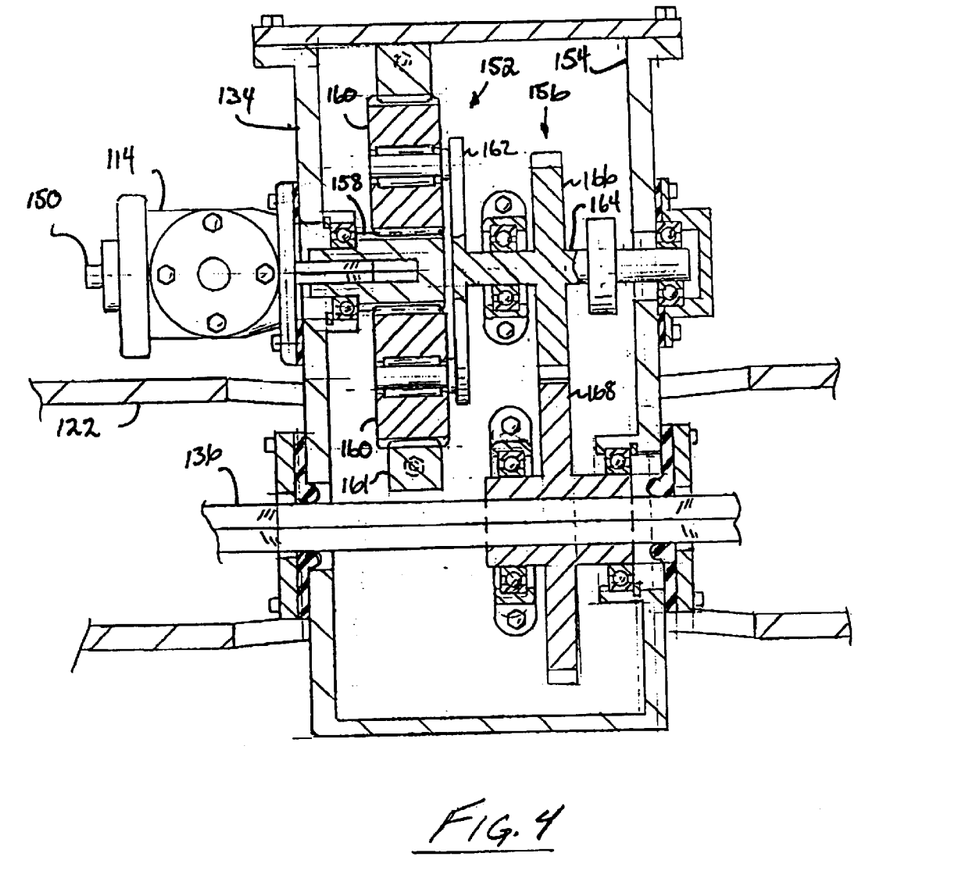
FIG. 4 is a cross sectional view of the left side hydraulic motor and gearbox showing the arrangement of the planetary gears and the spur gears inside by a cutting plane that intersects the rotational axes of both the hydraulic motor and the driveshaft.

Gearbox 134 is preferably disposed to extend through an aperture or opening in sidewall 122 of the vehicle such that hydraulic motor 114 and a portion of gearbox 134 are disposed inside the sidewall in the operator's compartment and the axle housings 137 and 138 together with a second portion of gearbox 134 are disposed outside the sidewall of the vehicle away from the operator's compartment.

Gearset 152 is a speed-reducing planetary gearset. Shaft 150 of motor 114 is coupled to and drives pinion gear 158. Pinion gear 158, in turn, drives planetary gears 160, which drive planetary gear carrier 162. Shaft 164 is fixed to and extends from planetary gear carrier 162. The ring gear 161 is fixed with respect to casing 154 and does not rotate.

Gearset 156 is a speed-reducing spur gearset that includes spur gears 166 and 168. These two gears are in meshing engagement. Since gear 166 has fewer teeth than gear 168, gear 168 rotates at a lower speed than gear 166. It is this difference in rotational speed that provides the speed-reducing capability of gearset 156. Gearset 156 is driven by shaft 164, on which spur gear 166 is mounted. Gear 166 rotates coaxial with shaft 150 of motor 114 and about the same fore-and-aft rotational axis Driveshaft 136 is coupled to spur gear 168 and rotates with gear 168 about the same fore-and-aft oriented rotational axis as gear 168. This axis is horizontal and parallel to and farther outboard (i.e. farther away from the center of the vehicle) than the rotational axis of motor 114. Gear 168 has a central hexagonal passage that slidingly supports and drivingly engages driveshaft 136, which passes therethrough.

Driveshaft 136 has two ends (FIG. 3): a first end 170 that extends through casing 154 forward of gearbox 134 toward the front of the vehicle; and a second end 172 that extends through casing 154 rearward of gearbox 134 toward the rear of the vehicle. The forward end of the driveshaft terminates in front axle housing 137 and the rearward end of the driveshaft terminates in rear axle housing 138. Both ends of the driveshaft inherently rotate in the same direction and at the same speed. In the preferred embodiment, shown here, the driveshaft 136 is a single elongate member that is inserted through spur gear 168. The hexagonal outer surface of driveshaft 136 engages internal hexagonal flats of the gear that define the surface of the hole passing through gear 168. These mating hexagonal surfaces are sized to permit spur gear 168 to rotate the driveshaft, while preferably permitting the driveshaft to slide laterally within the gear for easy insertion and removal. In this manner, whenever gear 168 is rotated by gear 166, driveshaft 136 is driven by spur gear 168 in the same direction and at the same speed. The driveshaft may be inserted or removed by unbolting driveshaft cover 205 (FIG. 3) from axle housing 138 and sliding the driveshaft to the right (in FIG. 3) until it is completely removed from both axle housings and gearbox.

Figure 5:
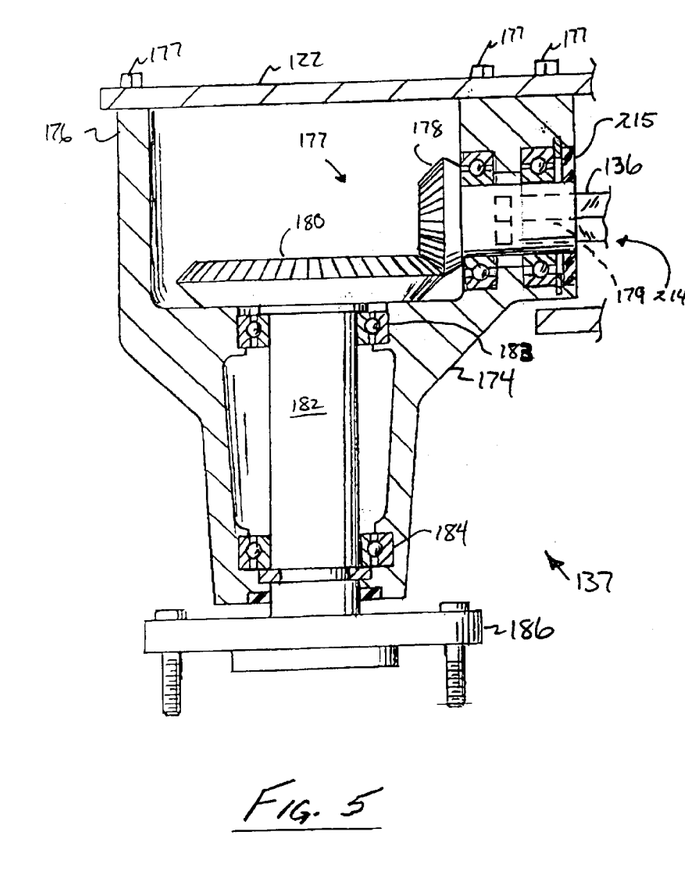
FIG. 5 is a cross-sectional view the forward axle housing of the left side drive system showing the internal components including the axle and the bevel gears.

Referring to FIGS. 3 and 5, front axle housing 137 includes an elongate generally conical casing 174 that is reduced in diameter the farther one moves away from the vehicle toward wheel 106. This casing 174 includes a flange 176 at its inboard end through which a plurality of bolts 175 are inserted to fix the flange (and hence casing 174) to left sidewall 122 of the vehicle. Casing 174, like the three other casings in the vehicle, supports the weight of the vehicle as it travels over the ground. The weight of the vehicle is transmitted from the chassis to the flanges, and thence through axle bearings located in the casing, to the axle. The weight on the axle is thence transmitted to the ground. Casing 174, unlike gearbox 134, is a stressed, load bearing structural member of the vehicle.

Front axle housing 137 also includes a speed-reducing bevel gearset 177, including bevel gear 178 that is coupled to and rotates with the forward end of driveshaft 136. It also includes bevel gear 180 that is coupled to and rotates with axle 182. Bevel gears 178 and 180 preferably rotate about axes disposed at a right angle to one another. Both axle 182 and drive shaft 136 lie in a horizontal plane and thus the right angle also lies in a horizontal plane. Bevel gear 180 is fixed to an inboard end of axle 182 and is supported within casing 174 by two bearings 183 and 184 that are spaced apart with respect to each other. It is these bearings that transmit the weight of the vehicle from casing 174 to axle 182 and thence to wheel 106 and the ground. Bevel gear 178 has an internal passage 179 defining hexagonal walls that engage the end of driveshaft 136, while preferably permitting the driveshaft to slide into and out of the gear. This sliding fit permits driveshaft 136 to be easily inserted into and removed from gear 178.

Wheel 106 (FIG. 3) is fixed to a flange 186 that extends radially outward from the outboard end of axle 182, using a plurality of lug nuts that pass through openings in the rim of the wheel to which lug nuts are fastened.

Gearset 177 is a speed-reducing gearset due to the relative sizes of the two bevel gears of which it is comprised. Bevel gear 178 has fewer teeth than bevel gear 180 and therefore rotates at a higher speed than axle 182.

Figure 6:
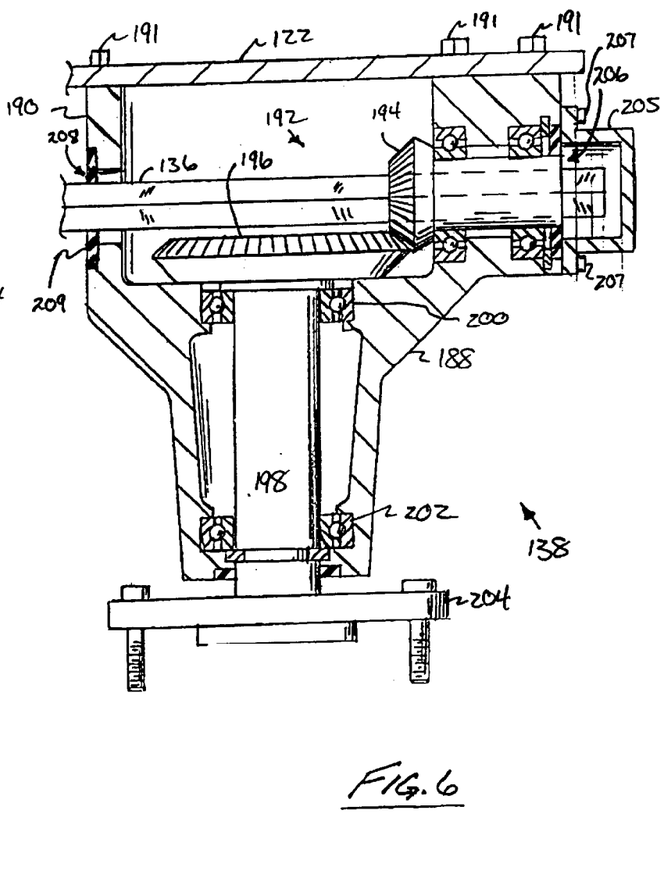
FIG. 6 is a cross-sectional view the rear axle housing of the left side drive system showing the internal components including the axle and the bevel gears.

Rear axle housing 138 includes an elongate generally conical casing 188 that is reduced in diameter the farther one moves away from the vehicle toward wheel 108. This casing 188 includes a flange 190 at its inboard end through which a plurality of bolts 191 are inserted to fix the flange (and hence casing 188) to left sidewall 122 of the vehicle. The weight of the vehicle is transmitted from the chassis to the flange, and thence through axle bearings located in the casing, to the axle. The weight on the axle is thence transmitted to the ground. Casing 188 is a stressed, load-bearing structural member of the vehicle.

Rear axle housing 138, like front axle housing 137, includes a speed-reducing bevel gearset 192, including bevel gear 194 that is coupled to and rotates with the rearward end of driveshaft 136. It also includes bevel gear 196 that is coupled to and rotates with axle 198. Bevel gears 194 and 196 preferably rotate about axes disposed at a right angle. Both axle 198 and driveshaft 136 lie in a horizontal plane and thus the right angle also lies in a horizontal plane. Bevel gear 196 is fixed to an inboard end of axle 198 and is supported within casing 188 by two bearings 200 and 202 that are spaced apart with respect to each other. It is these bearings that transmit the weight of the vehicle from casing 188 to axle 198 and thence to wheel 108 and the ground. Wheel 108 (FIG. 3) is fixed to a flange 204 that extends radially outward from the outboard end of axle 198 at its outboard end.

Axle housing 138 includes a cover 205. Cover 205 encloses and seals opening 206 in casing 188 and is fixed thereto by bolts 207. It is through opening 206 in casing 188 that driveshaft 136 is removed when cover 205 is removed.

During assembly or repair of the vehicle, with cover 205 removed, driveshaft 136 is inserted into opening 206, passes through bevel gear 194, which includes a hexagonal cylindrical passage that engages and slidingly supports the hexagonal driveshaft, passes through opening 208 and seal 209 in casing 188, through opening 210 and seal 211 in the casing of gearbox 134, through the central hexagonal passage in spur gear 168, then out of gearbox 134 through opening 212 and seal 213 in the casing of gearbox 134, then through opening 214 and seal 215 in casing 174 and thence into the hexagonal opening in bevel gear 178.

Gearset 192 is a speed-reducing gearset due to the relative sizes of the two bevel gears of which it is comprised. Bevel gear 194 has fewer teeth than bevel gear 196 and therefore rotates at a higher speed than axle 198.

As best shown in FIG. 2, an identical drive system is disposed on the right side of the vehicle that is a mirror image of the drive system on the left side of the vehicle. It is the same in all respects as the drive system on the left side of the vehicle, and therefore is not separately described herein. The front axles of the left and right side drive systems of the vehicle are preferably coaxial. The rear axles of the left and right side drive systems are also preferably coaxial.

Figure 7:
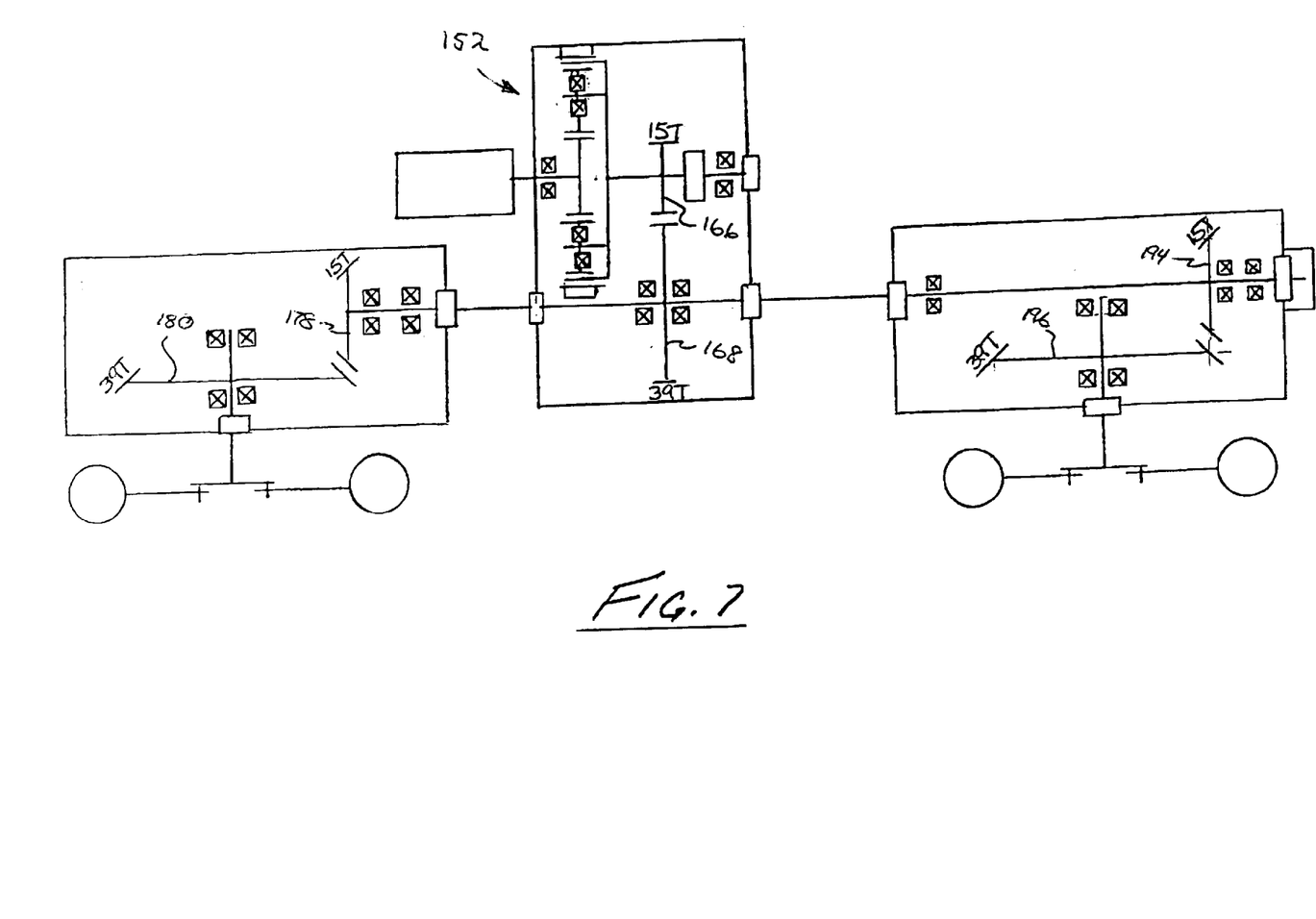
FIG. 7 is a schematic diagram of the left side drive system showing the various gear reductions.

FIG. 7 is a diagram of the reduction gear ratios provided by the drive systems and is illustrated in schematic form. Gearset 152, the planetary gear set in the preferred embodiment, has a sun gear with 17 teeth, a ring gear with 82 teeth, and planetary gears with 31 teeth. This gearset provides a gear reduction of 5.82 to 1. Gearset 156, which is also disposed inside the casing of gearbox 134, includes gear 166 with 15 teeth and gear 168 with 39 teeth, for a reduction ratio 39:15 or 2.6:1. These two reduction ratios provide an overall gear reduction for gearbox 134 of 15.1:1

It is preferably that gearbox 134 provides an overall gear reduction of 10:1 to 25:1 it is also preferable (within gearbox 134) that planetary gearset 152 provides a gear reduction of 3:1 to 10:1, and that gearset 156 provides a gear reduction of 2:1 to 4:1.

Referring back to FIG. 7, gearset 177 in forward axle housing 177 includes gear 178 with 15 teeth and gear 180 with 39 teeth for a reduction ratio of 39:15 or 2.6:1. Gearset 192 in rear axle housing 138 includes gear 194 with 15 teeth and gear 196 with 39 teeth for a reduction ratio of 39:15 or 2.6:1.

It is preferable that both of gears 178 and 194 have the same number of teeth and both of gears 180 and 196 have the same number of teeth. It is also preferably that the reduction ratio of both front and rear axle housings be the same, and that both are between 2:1 to 4:1.

Finally, it is preferably that the gear reduction ratio of gearbox 134 with respect to the gear reduction ratio of the front and rear axle housings is between 4:1 and 10:1. in other words that the overall gear reduction provided by gearbox 134 is between 4 and 10 times as great as the gear reduction provided by the gearsets in the axle housings.

While the discussion above relates to the drive system for the left side of the vehicle, the same number of gear teeth, gear ratios and desirable gear ratios would be the same for the drive system on the opposing side of the vehicle.

Figure 8:
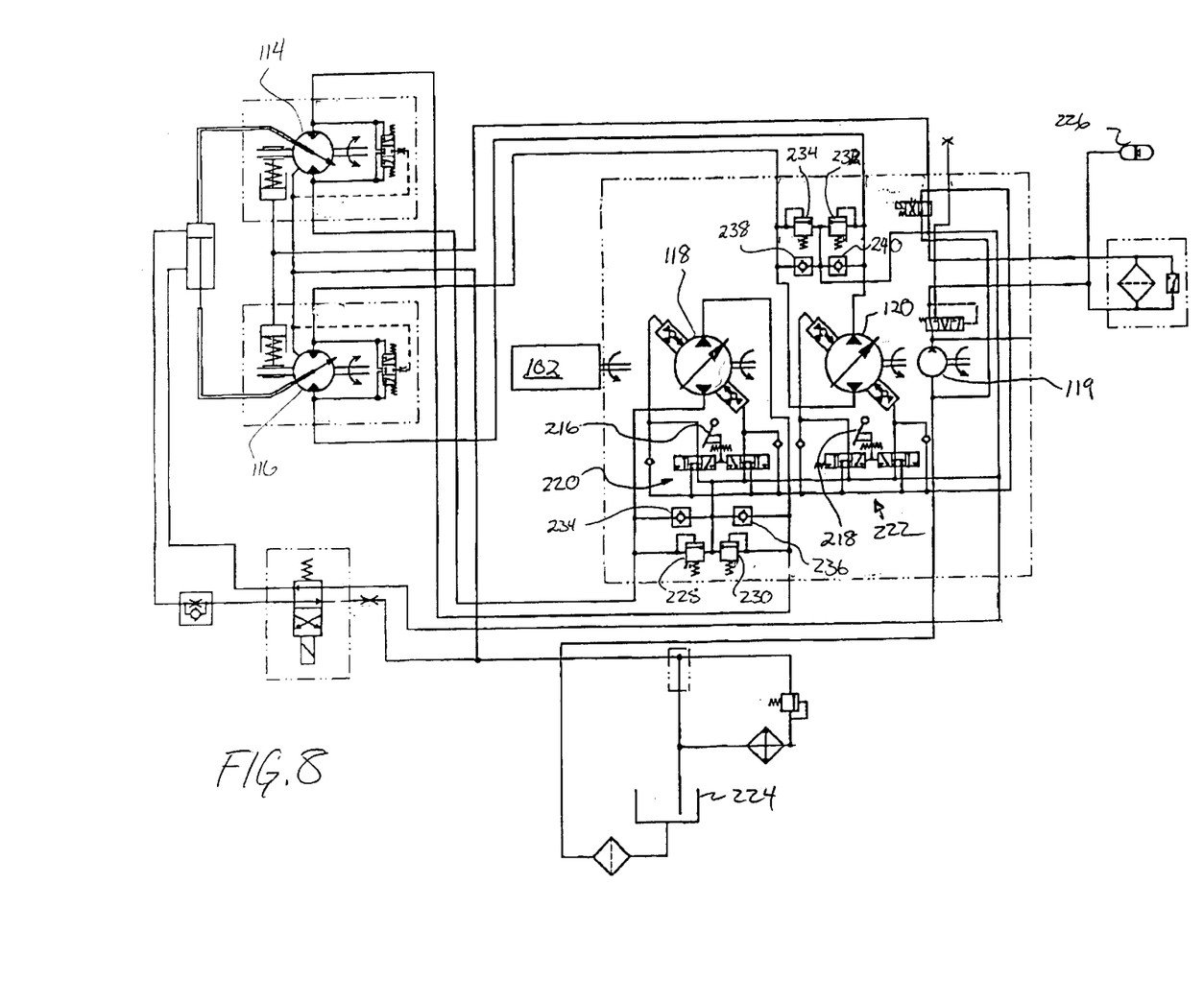
FIG. 8 is a schematic diagram of a hydraulic drive circuit indicating how pumps 118 and 120 are coupled to motors 114 and 116 to supply them with hydraulic fluid and thereby drive the vehicle over the ground.

FIG. 8 illustrates the hydraulic circuit for driving the skid steer vehicle. It includes engine 102 that is coupled to and drives hydraulic pumps 118 and 120, that in turn, are hydraulically coupled to and drive hydraulic motors 114 and 116, respectively.

Pumps 118 and 120 are variable displacement hydraulic pumps, which are hydraulically coupled to two respective hand controls 216 and 218 for controlling the displacement of the pumps. Hand controls 216 and 218 are respectively mechanically coupled to and control the position of hydraulic valves 220 and 222. Hydraulic valves 220 and 222, are, in turn, hydraulically coupled to pumps 118 and 120 to vary the displacement of these pumps. The displacement of the pumps can be not only varied in magnitude, but in direction, as well. By manipulating each of the hand controls away from a neutral position in a first direction, hydraulic fluid can be made to flow in a first direction through the associated pump. By manipulating each of the hand controls away from a central neutral position in a second, and opposing direction, hydraulic fluid can be made to flow in a second opposite direction through the associated pump.

Pumps 118 and 120 are in fluid communication with motors 114 and 116, respectively. More particularly, pump 118 is in a series hydraulic circuit with motor 114 and pump 120 is in a series hydraulic with motor 116. These two circuits are independent. Substantially all the hydraulic fluid provided by pump 118 is directed to and through motor 114 and substantially all the hydraulic fluid provided by pump 120 is directed to and through motor 116.

Motors 114 and 116 are bi-directional. In other words, they will turn in both directions depending upon the direction of fluid flow through the motors. Thus, when the hand controls are manipulated, they can drive the wheels on each side of the vehicles independently of the wheels on the other side of the vehicle. They can drive the wheels on both sides of the vehicle forward (and at different or the same speed). They can drive the wheels on opposing sides of the vehicle backwards (and at the same or different speeds). They can drive the wheels on opposing sides of the vehicle in opposite directions and at the same or different speeds. By "opposite directions" we mean that the wheels on one side of the vehicle can be driven in a direction to move that side of the vehicle forward and the wheels on the opposing side of the vehicle can be driven in a rotational direction that will move that side of the vehicle backward.

A third pump is provided in FIG. 8, called charge pump 119. Charge pump 119 is in fluid communication with hydraulic motors 114 and 116, and hydraulic pumps 118 and 120 to provide "make-up" hydraulic fluid for the hydraulic circuits extending between with hydraulic motors 114 and 116, and hydraulic pumps 118 and 120. These circuits may leak, and they may lose fluid when overpressurized. As a result, some means to supply them with additional hydraulic fluid is required. Hydraulic charge pump 119 provides that capability. Charge pump 119 sucks fluid from tank 224 and supplies it under pressure to accumulator 226. Accumulator 226, in turn is in fluid communication with the series drive circuits and supplies them with hydraulic fluid to make up their losses.

The two series hydraulic circuits that extend between pump 118 and motor 114 and between pump 120 and motor 116 are provided with pressure relief and anti-cavitation valves.

The series circuit including pump 118 and motor 114 also includes back to-back pressure relief valves 228 and 230 that are in fluid communication with the two respective conduits extending from pump 118 to motor 114. These valves 228 and 230 are also coupled to tank 224. When the pressure in either conduit exceeds the operating pressure, the pressure relief valve opens and conducts fluid back to tank 224. Pressure relief valves 232 and 234 are similarly coupled to the two conduits extending between pump 120 and motor 116 to provide the same function.

The series circuit including pump 118 and motor 114 also includes back-to-back anti-cavitation valves 236 and 238, each coupled in parallel with pressure relief valves 228 and 230. These valves are essentially check valves that permit fluid from tank 224 to be sucked into the conduits extending between pump 118 and motor 114 whenever the pressure in those conduits approaches zero psi. By permitting hydraulic fluid to be sucked back into these conduits, the pressure in the conduits is maintained above that at which the hydraulic fluid would flash into vapor—i.e. cavitation pressure. Another pair of anti-cavitation valves 238 and 240 are similarly coupled to and between the hydraulic lines that extend between pumps 120 and motor 116, and tank 224 to provide the same anti-cavitation function for the hydraulic circuit that controls the motors on the right-hand side of the vehicle.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

For example, the particular types of gear sets, whether spur, bevel or planetary can be replaced with gears sets of another type. Furthermore, the hexagonal driveshaft can be a splined drive shaft. Even further, the driveshaft can be split into two parts, one extending forward and one extending backward from gearbox 134 to engage the forward and rear axle housings. Additionally, the driveshaft can have female ends rather than the described male ends and the corresponding bevel gears that it engages in the forward and rear axle housings can have male members rather that hollow female members to engage the ends of the drive shaft or drive shafts. Gearbox 134 can include an internal shaft on which gear 168 is mounted that extends to the two openings through which drive shaft 136 passes. This internal shaft can be engageable with the forward and rearward extending axles discussed as alternatives above. The axles and bevel gears thereon can be forged in a single net forging process as a single unitary structure. The axle housings are shown as a single housing fixed against the sidewalls of the vehicle to provide a complete enclosure for the reduction gears inside the axle housings. In an alternative embodiment, a cover can be fixed to the axle housings directly adjacent to the side walls of the vehicle to provide a compete enclosed axle housing that encloses the reduction gear sets within even when the axle housings are removed from the side walls of the vehicle.

What is claimed is:

1. A skid steer vehicle, comprising:
   a chassis having first and second sidewalls;
   an engine mounted to the chassis and having at least first and second hydraulic pumps; and
   first and second drive systems, disposed adjacent to the first and second sidewalls, respectively, each drive system including:
      a hydraulic motor including an output shaft with an axis of rotation;
      a gearbox coupled to the hydraulic motor and including a first reduction gear set driven by the hydraulic motor;
      a driveshaft having an axis of rotation, the driveshaft extending from the gearbox and having a first end disposed forward of the gearbox and a second end disposed rearward of the gearbox;
      a first axle assembly including a first axle housing coupled to the first end of the driveshaft, a second reduction gear set and a first axle that extends laterally outward away from the first axle housing, wherein the first axle housing houses at least the second reduction gear set;
      a second axle assembly including a second axle housing coupled to the second end of the driveshaft, a third reduction gear set and a second axle that extends laterally outward away from the second axle housing, wherein the second axle housing houses at least the third reduction gear set; and
      a wheel driven by one of the first and second axles;
   wherein the hydraulic motor of the first drive system is fluidly coupled to the first hydraulic pump to be driven thereby and further wherein the hydraulic motor of the second drive system is fluidly coupled to the second hydraulic pump to be driven thereby, and
   wherein the first reduction gear set includes a speed-reducing planetary gear set and a speed-reducing spur gear set.

2. The vehicle of claim 1, wherein the second and third reduction gear sets each includes a speed-reducing bevel gear set and further wherein the second and third speed reducing bevel gear sets provide the same speed reduction.

3. The vehicle of claim 1, wherein the driveshaft is a single elongate member and extends through the first gearbox.

4. The vehicle of claim 1, wherein the axis of rotation of the hydraulic motor and the axis of rotation of the driveshaft of the first drive system are parallel and the axis of rotation of the hydraulic motor and the axis of rotation of the driveshaft of the second drive system are parallel.

5. The vehicle of claim 1, wherein the speed-reducing planetary gear set drives the speed-reducing spur gear set.

6. The vehicle of claim 1, wherein the hydraulic motor of the first drive system is located within the first sidewall and the driveshaft is located outside the first sidewall.

7. The vehicle of claim 6, wherein the hydraulic motor of the second drive system is located within the second sidewall and the driveshaft is located outside the second sidewall.

8. The vehicle of claim 1, wherein a first portion of the gearbox of the first drive system is disposed inside the first sidewall and a second portion of the gearbox of the first drive system is disposed outside the first sidewall.

9. The vehicle of claim 8, wherein a first portion of the gearbox of the second drive system is disposed inside the second sidewall and a second portion of the gearbox of the second drive system is disposed outside the second sidewall.

10. A drive system for a work vehicle, comprising:
   a hydraulic motor including an output shaft with an axis of rotation;

a gearbox coupled to the hydraulic motor and including a first reduction gear set driven by the hydraulic motor;

a driveshaft having an axis of rotation, the driveshaft extending from the gearbox and having a first end disposed forward of the gearbox and a second end disposed rearward of the gearbox;

a first axle assembly including a first axle housing coupled to the first end of the driveshaft, a second reduction gear set and a first axle that extends laterally outward away from the first axle housing, wherein the first axle housing houses at least the second reduction gear set;

a second axle assembly including a second axle housing coupled to the second end of the driveshaft, a third reduction gear set and a second axle that extends laterally outward away from the second axle housing, wherein the second axle housing houses at least the third reduction gear set; and a wheel driven by one of the first and second axles, wherein the first reduction gear set includes a speed-reducing planetary gear set and a speed-reducing spur gear set.

11. The drive system of claim 10, wherein the second and third reduction gear sets each includes a speed-reducing bevel gear set and further wherein the speed reducing bevel gear set of both the first and second reduction gear sets provides the same speed reduction.

12. The drive system of claim 10, wherein the driveshaft is a single elongate member and extends through the first gearbox.

13. The drive system of claim 10, wherein the axis of rotation of the hydraulic motor and the axis of rotation of the driveshaft are parallel.

14. The drive system of claim 10, wherein the speed-reducing planetary gear set drives the speed-reducing spur gear set.

* * * * *